United States Patent
Larsen

(10) Patent No.: US 11,058,125 B2
(45) Date of Patent: Jul. 13, 2021

(54) PIN BONE REMOVAL APPARATUS

(71) Applicant: MAREL SALMON A/S, Stovring (DK)

(72) Inventor: Palle Kærgaard Larsen, Vodskov (DK)

(73) Assignee: MAREL SALMON A/S, Stovring (DK)

( * ) Notice: Subject to any disclaimer, the term of this patent is extended or adjusted under 35 U.S.C. 154(b) by 36 days.

(21) Appl. No.: 16/627,614

(22) PCT Filed: Jul. 3, 2018

(86) PCT No.: PCT/EP2018/067943
§ 371 (c)(1),
(2) Date: Dec. 30, 2019

(87) PCT Pub. No.: WO2019/007953
PCT Pub. Date: Jan. 10, 2019

(65) Prior Publication Data
US 2021/0068408 A1    Mar. 11, 2021

(30) Foreign Application Priority Data
Jul. 3, 2017   (EP) .................................. 17179355

(51) Int. Cl.
  *A22C 25/00*   (2006.01)
  *A22C 25/16*   (2006.01)
  *A22C 25/08*   (2006.01)
(52) U.S. Cl.
  CPC ............ *A22C 25/166* (2013.01); *A22C 25/08* (2013.01)
(58) Field of Classification Search
  CPC .............................. A22C 25/08; A22C 25/166
  (Continued)

(56) References Cited

U.S. PATENT DOCUMENTS 7,857,686 B2 * 12/2010 Arnason ................. A22C 25/17
                                                       452/161
7,883,400 B2 *  2/2011 Shipman ............... A22C 25/166
                                                       452/138
(Continued)

FOREIGN PATENT DOCUMENTS

DK    178927 B1    6/2017
EP   1871170 A2    1/2008
EP   2957175 A1   12/2015

OTHER PUBLICATIONS

European Search Report from EP Application No. EP17179355, dated Sep. 29, 2017.
(Continued)

*Primary Examiner* — Richard T Price, Jr.
(74) *Attorney, Agent, or Firm* — Workman Nydegger

(57) ABSTRACT

A pin bone removal apparatus is provided for removing pin bones in fish fillets while a conveyor conveys the fish fillets at a first conveying speed. A plurality of pin bone removal units is provided, each having a pin bone roller for pulling the pin bones from the fish fillets. The apparatus includes a closed-loop rail structure on which the pin bone removal units are slideable attached, where the closed-loop rail structure comprises a processing section and a returning section. The processing section is where at least one of the plurality of pin bone removal units is moved parallel to the fish fillets at a second conveying speed and engages with the surface of the fish fillets. After the pin bone removal the at least one pin bone removal unit is recirculated along the returning section.

17 Claims, 2 Drawing Sheets

(58) Field of Classification Search
USPC .......................................................... 452/135
See application file for complete search history.

(56) References Cited

U.S. PATENT DOCUMENTS

| | | | | |
|---|---|---|---|---|
| 7,922,567 | B2* | 4/2011 | Gulak | A22C 17/04 |
| | | | | 452/138 |
| 8,840,449 | B2* | 9/2014 | Vigre | A22C 25/08 |
| | | | | 452/185 |
| 8,894,475 | B2* | 11/2014 | Breiland | A22C 25/166 |
| | | | | 452/135 |
| 2021/0068408 | A1* | 3/2021 | Larsen | A22C 25/166 |

OTHER PUBLICATIONS

International Search Report and Written Opinion from PCT Application No. PCT/EP2018/067943, dated Dec. 7, 2018.

* cited by examiner

PIN BONE REMOVAL APPARATUS

FIELD OF THE INVENTION

The present invention relates to a pin bone removal apparatus for removing pin bones in fish fillets while the fish fillets are conveyed by a conveyor means at a first conveying speed, and to a method of performing the same.

BACKGROUND OF THE INVENTION

DK178927 discloses a pin bone removal apparatus for removing pin bones in fish flesh, where a pin bone removal unit is arranged on a robotic arm having multiple degrees of freedom such as 3 dimensional movement, rotational movement around the axis of the arm or around a swivel at the end of the arm. A scanner is arranged in front of the pin bone removal unit, where the image data from the scanner is used to operate the movement of the robotic arm. This arrangement is however very complex and costly.

SUMMARY OF THE INVENTION

On the above background it is an object of embodiments of the present invention to provide a simplified pin bone removal arrangement for removing pin bones in fish fillets, such as salmon fish fillets, that that has high throughput.

In general, the invention preferably seeks to mitigate, alleviate or eliminate one or more of the above mentioned disadvantages of the prior art singly or in any combination. In particular, it may be seen as an object of embodiments of the present invention to provide an apparatus that solves the above mentioned problems, or other problems.

To better address one or more of these concerns, in a first aspect of the invention a pin bone removal apparatus is provided for removing pin bones in fish fillets while the fish fillets are conveyed by a conveyor means at a first conveying speed, comprising:
a plurality of pin bone removal units, each of which comprises a pin bone roller for pulling the pin bones from the fish fillets, and
wherein the apparatus further comprises:
a closed loop rail structure to which the plurality of pin bone removal units are slideable attached to, where the closed loop rail structure comprises a processing section, and a returning section, the processing section being a section where at least one of the plurality of pin bone removal units are moved parallel to said fish fillets at a second conveying speed and engage with the surface of the fish fillets while removing the pin bones therefrom with said pin bone roller, where subsequent to the pin bone removal the at least one pin bone removal unit is recirculated along said returning section and back to a starting position of said processing section where said the pin bone removal process is repeated on forthcoming fish fillets.

Accordingly, a simple and compact solution is provided for removing the pin bones from the fish fillets with high throughput.

The pin bone rollers may be formed as cylinders which can rotate and which have one or more grooves configured to catch pin bones while the roller is moved over the fish fillets.

A relative speed between the pin bone rollers may be caused by the rotation of the rollers, but particularly, it may be caused by a difference in the first and second conveying speeds.

The rollers may be arranged such that the direction of rotation corresponds to the direction of movement of the pin bone removal units, i.e. such that the combined rotation of the rollers and the movement of the pin bone removal units reduces the effective speed of the surface of the roller relative to the fish. Alternatively, the direction of rotation is opposite the direction of movement of the pin bone removal units such that the effective speed of the surface of the rollers relative to the fish fillets increases.

Each of the plurality of pin bone removal units may be provided with a drive unit to drive the units along the closed loop path defined by the rail structure. A single common drive unit may also be utilized to drive said plurality of pin bone removal unit that may be attached to e.g. a chain and the like.

The direction of the first speed and the second speeds during pin bone removal could be the same, i.e. the pin bone removal units could be moved in the same direction as the fish fillets, i.e. such that the combined movement of the fish filets and the movement of the pin bone removal units reduces the effective speed of the surface of the rollers relative to the fish.

In one embodiment, said first conveying speed is larger than said second conveying speed. It is thus ensured that after a pin bone removal unit selected from said plurality of pin bone removal units engages with pin bones at the head end of the fish fillet, the relative speed differences ensures that the pin bone removal unit smoothly moves towards the tail end while removing the remaining pin bones. The first and the second speeds may of course be selected such that the relative speed difference is optimal such that e.g. it is ensured that no pin bones will break. Results show as an example that a preferred speed of the first conveying speed is around 24 m/minute and the second speed is around 18 m/minute such that the relative speed difference is around 6 m/minute.

In one embodiment, the position of the plurality of pin bone removal units is synchronized to the position of the fish fillets such that when a pin bone removal unit arrives at said processing section it is positioned at a head part of an incoming fish fillet. It is thus ensured that all the pin bones will be removed, i.e. that the pin bone removal unit starts where the pin bones start at the head end. The infeed of the fish fillets may as an example be fully controlled and synchronized to the position of the pin bone removal unit by means of tracking the position of the pin bone removal units at all times, where the exact position of the pin bone removal unit may be tracked at all times. Also, an initial position of each of the fish fillets may be known when e.g. leaving from a certain position, e.g. an infeed station, and subsequently be tracked from there. Accordingly, knowing the exact position where the pin bone removal unit arrives and the position of the fish fillets, it may be ensured that the initial position of the pin bone removal unit arrives at the processing section at the right time.

In one embodiment, the closed loop rail structure is designed such that after removing the pin bones from said fish fillet, the pin bone removal units have reached an end part of said processing section. Accordingly, the length of the processing section is kept as short as possible, and therefore the overall size of the apparatus, such that after the pin bone removal unit has removed the pin bones it is recirculated and the process is repeated for subsequent fish fillets.

In one embodiment, the length of the processing section corresponds to a length of at least two fish fillets and where said pin bone removal is performed by at least two pin bone removal units at a time on two or more different fish fillets. The fact that the length of the fish fillets may vary, the two larger types of fish fillets are used as a reference.

In one embodiment, said conveyor means comprises an endless belt on which said fish fillets are resting while being conveyed, where said apparatus further comprises a member arranged below the endless belt configured to supply an upward pressure on said endless belt and on the fish fillets while the pin bone removal takes place. Accordingly, by supplying such a pressure, preferably within a centre of the fish fillet, the pin bones become exposed which facilitates the pin bone removal by the pin bone removal units.

In one embodiment, said member is connected to a moving mechanism and is advanced in a synchronized manner with a pin bone removal unit while the pin bone removal takes place such that the member and the pin bone removal unit may be in the same vertical plane. The member, which may also be referred to as a pin bone exposing member, may accordingly be re-circulated along a return loop and be synchronized with a pin bone removal unit at the beginning of the processing section, where the process may be repeated. In an embodiment, there are several such members to supply such a force during the pin bone removal, i.e. each pin bone exposing member may be associated with a given pin bone removal unit, where the number of the members may be selected based on the number of pin bone removal units. The members may have any type of geometrical structure, e.g. be spherical, triangular, elliptical, or be an elongated members having a longitudinal axis being parallel to a longitudinal axis of the fish fillets while the pin bone removal takes place. The members may also be elongated and extend across the conveyor belt perpendicular to the conveying direction.

In one embodiment, the apparatus further comprises:
a detection mechanism arranged upstream to the closed loop rail structure for detecting at least one characteristics of incoming fish fillets, and
a control unit connected to the detection mechanism configured to utilize the data from the detection mechanism in operating the plurality of the pin bone removal units.

The detection mechanism may as, an example, comprise an X-ray device, a digital camera, a line scanner and the like that is well known to a skilled person in the art. Accordingly, it is now possible to accurately operate the position of the pin bone removal units which may e.g. be of relevance when the infeed of the fish fillets is uneven.

In an embodiment, the returning section comprises a "halting section" and where the step of operating the plurality of the pin bone removal units comprises controlling the movement of said pin bone removal unit from said halting section back to said processing section.

In one embodiment, the step of recirculating at least one pin bone removal unit along the returning section comprises accelerating the at least one pin bone removal unit up to said starting position.

In one embodiment, said plurality of pin bone removal units comprise side structures or a frame to which said pin bone roller is attached to.

The closed loop rail structure may me a vertical carousel rail structure rotating around a horizontal rotation axis, or a horizontal rail structure rotating about a vertical rotation axis. An angled arrangement of the rail structure may also be provided with a rotation axis being between 0-90°.

In one embodiment, the apparatus further comprises a cleaning station arranged at the closed loop rail structure, e.g. at the returning section, such that the pin bone removal units, after the pin bone removal, pass through the cleaning station where the pin bone removal units are cleaned. This may as an example be done using water, e.g. high pressurized water, air blow and the like to remove the pin bones that may stick to the pin bone rollers. Accordingly, it is ensured that the pin bone removal units are clean from pin bones when arriving at the processing section.

According to a second aspect of the invention, a method is provided for removing pin bones in fish fillets while the fish fillets are conveyed by a conveyor means at a first conveying speed using a pin bone removal apparatus which comprises:
a plurality of pin bone removal units, each of which comprises a pin bone roller for pulling the pin bones from the fish fillets, and
a closed loop rail structure to which the plurality of pin bone removal units are slideable attached to, where the closed loop rail structure comprises a processing section, and a returning section, wherein the method comprises:
moving at least one pin bone removal unit along the processing section parallel to said fish fillets at a second conveying speed and engaging the pin bone removal unit with the surface of the fish fillets while removing the pin bones therefrom with said pin bone roller, where subsequent to the pin bone removal,
recirculating the at least one pin bone removal unit along said returning section and back to a starting position of said processing section where said the pin bone removal process is repeated on a forthcoming fish fillet.

The fish fillet is typically a salmon fish fillet, but the present invention may also apply to any other types of fish, such as, but not limited to, white fish.

BRIEF DESCRIPTION OF THE DRAWINGS

Embodiments of the invention will be described, by way of example only, with reference to the drawings, in which.

DESCRIPTION OF EMBODIMENTS

Figure 1A:
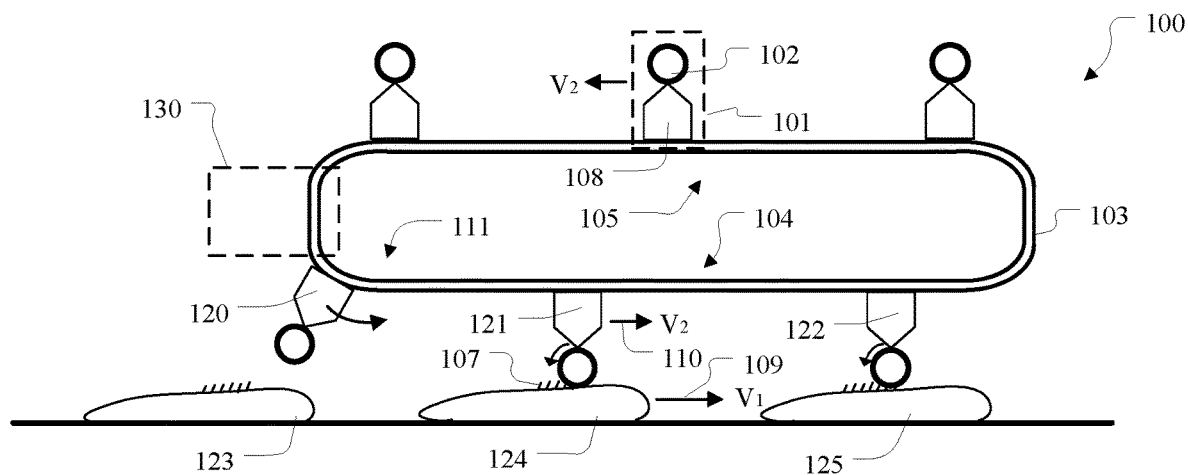
FIG. 1a-c depicts graphically one embodiment of a pin bone removal apparatus according to the present invention for removing pin bones in fish fillets.
Figure 1B:
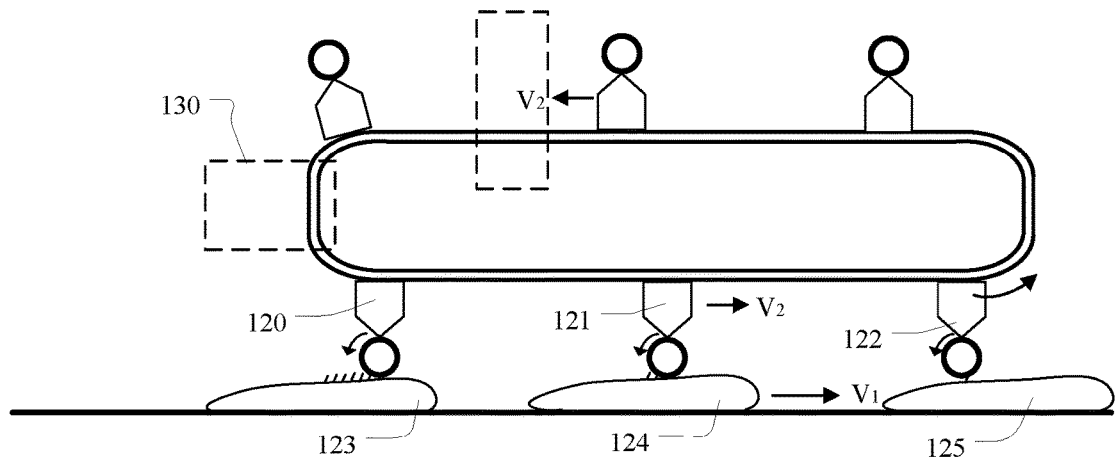
Figure 1C:
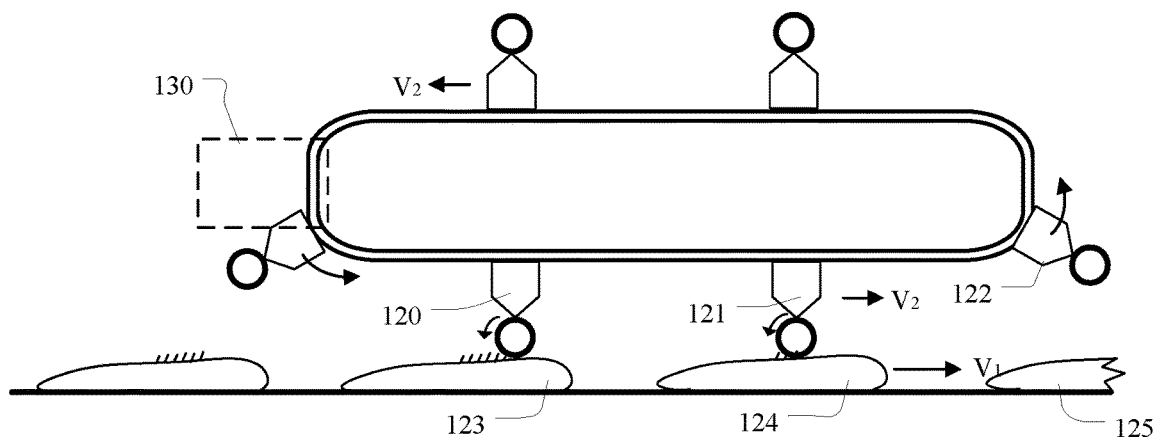

FIG. 1a-c depicts graphically one embodiment of a pin bone removal apparatus 100 according to the present invention for removing pin bones 107 in fish fillets 123-125, while the fish fillets are conveyed by a conveyor means at a first conveying speed V1 as indicated by arrow 109.

The apparatus comprises a plurality of pin bone removal units 101, 120-123, or as shown here six units, each of which comprises a pin bone roller 102 for pulling the pin bones from the fish fillets. This number should of course not be construed as being limited to six, but the number could just as well be more than six or less than six.

The apparatus further comprises a closed loop rail structure 103 to which the plurality of pin bone removal units are slideable attached. As shown here, the rail structure is a vertically arranged carousel like structure having a horizontal rotation axis. This should however not be construed as a vertical carousel structure, but a horizontally arranged carousel structure, or a carousel structure having a rotation axis between 0-90° is also possible.

The closed loop rail structure 103 comprises a processing section 104, and a returning section 105, where the processing section is a section where at least one of the plurality of pin bone removal units are moved parallel to and above said fish fillets at a second conveying speed V2 as indicated by arrow 110 and engage with the surface of the fish fillets, where the second conveying speed V2 is different from, e.g. less than the first conveying speed V1. In one embodiment, V1 may be between 20-26 m/minute and V2 is between 15-19 m/s. This should of course not be construed as being limited to this range, but the important issue here is that during the pin bone removal the fish fillets is moving with higher speed such that it smoothly exceeds the pin bone removal units 120-122.

As shown in FIG. 1a-c the location of incoming fish fillets 123-125 and the position of the pin bone removal units 120-122 is synchronized such that when e.g. the pin bone removal unit 120 leaves the returning section 105 and enters the begin 111 of the processing section 104 it engages with the head end of the fish fillet 123 and with the starting point of the pin bones 107, where, due to the speed difference between the fish fillets and the pin bone removal unit, the pin bone removal unit 120 moves smoothly towards the tail end of the fish fillet. The geometrical size of the closed loop rail structure 103 is designed such that after the pin bone removal, as shown in FIG. 1b where pin bone removal unit 122 is just completing the pin bone removal on fish fillet 125, it immediately moves from the processing section 104 to the returning section 105 as shown in FIG. 1c.

As shown in the embodiment, the plurality of pin bone removal units comprise side structures 108 to which said pin bone rollers 102 are attached.

In this embodiment, the apparatus further comprises a cleaning station 130 arranged at the closed loop rail structure, or as shown here at the returning section, for allowing the bone removal units to pass there through and for removing pin bones from the pin bone rollers.

Figure 2:
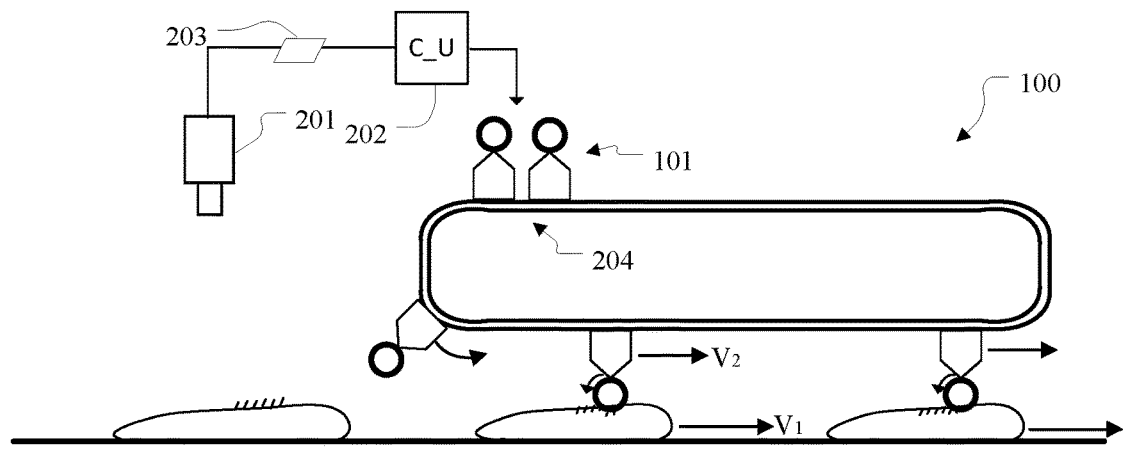
FIG. 2 shows another embodiment of the pin bone removal apparatus shown in FIG. 1, FIGS. 3a and 3b show a side view of an embodiment where fish fillet (see FIG. 1) is resting on an endless conveyor belt associated with said conveyor means while being conveyed.

FIG. 2 shows another embodiment of the pin bone removal apparatus 100 shown in FIG. 1, where in this embodiment a detection mechanism 201, e.g. a camera, line scanner, X-ray device and the like, is arranged upstream to the closed loop rail structure for detecting at least one characteristics of incoming fish fillets such as the exact position of the fish fillet, or the pin bone location. In this embodiment, the apparatus further comprises a control unit 202 that is connected to the detection mechanism 201 configured to utilize the data 203 from the detection mechanism in operating the plurality of pin bone removal units 101. This means that the synchronized movement between the incoming fish fillets and the pin bone removal units is not implemented in this embodiment, but instead of synchronized movement, positioning or movement of the pin bone removal units is controlled in accordance with the position of the incoming fish fillets such that at the beginning of the processing section, the pin bone removal units engage with the fish fillets at the beginning of the pin bones at the head end. As shown here, a kind of a halting position may be provided where two or more pin bone removal units are accumulated to make them ready at the end of the recirculation section.

Each of the pin bone removal units may be motor driven so as to allow them to be independently driven.

Figure 3A:
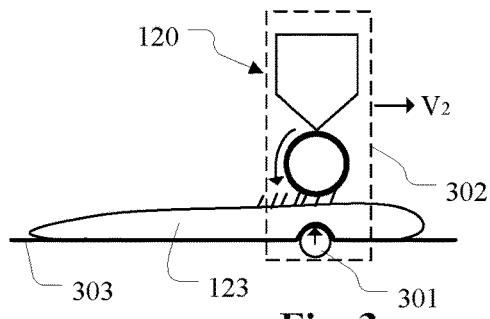
Figure 3B:
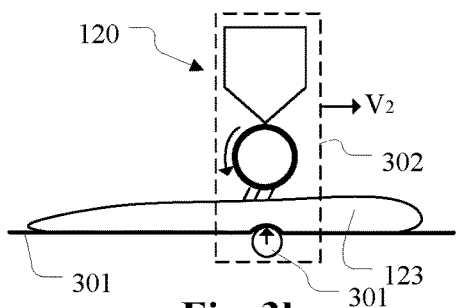

FIGS. 3a and 3b show a side view of an embodiment where fish fillet 123 (see FIG. 1) is resting on an endless conveyor belt 303 associated with said conveyor means while being conveyed, and where this embodiment comprises a member 301 arranged below the endless belt 303 configured to supply an upward pressure as indicated by the arrow on said endless belt and on the fish fillets while the pin bone removal takes place, whereby by supplying such a pressure, preferably within a centre of the fish fillet, the pin bones become exposed which facilitates the pin bone removal by the pin bone removal units. It should be noted that during the pin bone removal as shown in FIG. 1, there is such a member arranged below of each of the pin bone removal units (not shown in FIG. 1), where the members may move along a closed loop path and be re-circulated (not shown) to the beginning position of the processing section after the completion of the pin bone removal. In that way, both the pin bone removal units and the members are synchronized in such a manner.

As shown here, the member 301 and the pin bone removal units 120 are connected together to a moving mechanism 302 that advances the member 301 and the pin bone removal units 120 in a synchronized manner as shown in FIGS. 3a and 3b while the pin bone removal takes place such that the member and the pin bone removal unit are essentially in the same vertical plane as shown here. By doing so, the pin bone removal is greatly enhances due to the full exposure of the pin bones during the pin bone removal.

Figure 4A:
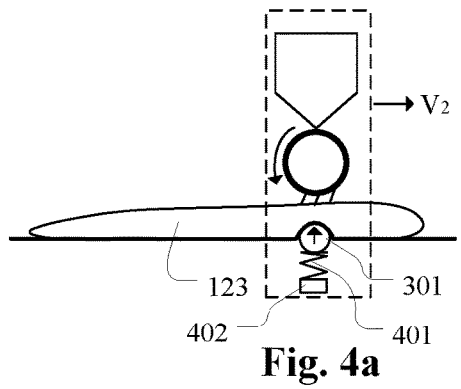
FIGS. 4a and 4b show another alternative of the embodiment in FIGS. 3a and 3b, and FIGS. 5 and 6 show a front/rear view of the embodiment in FIGS. 4a and 4b.
Figure 4B:
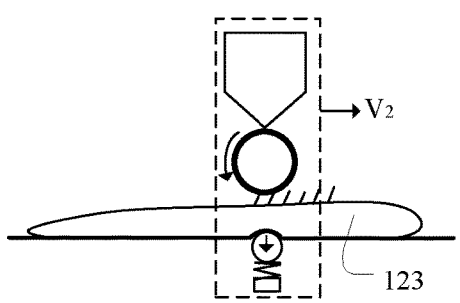

FIGS. 4a and 4b show another alternative of the embodiment in FIGS. 3a and 3b showing where a spring load 401 is arranged between a base structure 402 and said member 301 where the spring load 401, which as shown here is a regular spring, supplies the optimal pressure needed to remain said exposure of the pin bones during the pin bone removal.

Figure 5:
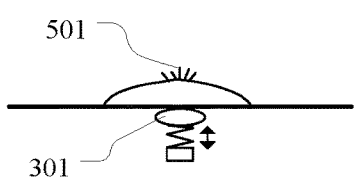
Figure 6:
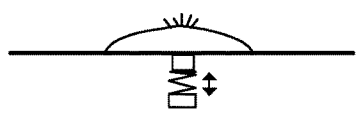

FIGS. 5 and 6 show a front/rear view of the embodiment in FIGS. 4a and 4b to illustrate in more details a possible shape of the member 301 and also to illustrate graphically how the pin bones 501 are exposed due to said pressure of the member. The geometrical shape of said member may vary, e.g. have circular shape, elliptical shape, triangular shape, or the member may comprise an elongated cylinder that may be arranged parallel to a longitudinal axis of the fish fillet.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A pin bone removal apparatus for removing pin bones in fish fillets while the fish fillets are conveyed by a conveyor means at a first conveying speed, comprising:
 a plurality of pin bone removal units, each of which comprises a pin bone roller for pulling the pin bones from the fish fillets, and
 wherein the apparatus further comprises:

a closed loop rail structure to which the plurality of pin bone removal units are slideable attached, where the closed loop rail structure comprises a processing section, and a returning section, the processing section being a section where at least one of the plurality of pin bone removal units are moved parallel to said fish fillets at a second conveying speed and engage with the surface of the fish fillets while removing the pin bones therefrom with said pin bone roller, where subsequent to the pin bone removal the at least one pin bone removal unit is recirculated along said returning section and back to a starting position of said processing section where said the pin bone removal process is repeated on forthcoming fish fillets.

2. The pin bone removal apparatus according to claim 1, wherein the second conveying speed is different from the first conveying speed.

3. The pin bone removal apparatus according to claim 1, wherein said first conveying speed is larger than said second conveying speed.

4. The pin bone removal apparatus according to claim 1, wherein the position of the plurality of pin bone removal units is synchronized to the position of the fish fillets such that when a pin bone removal unit arrives at said processing section it is positioned at a head part of an incoming fish fillet.

5. The pin bone removal apparatus according to claim 4, wherein the closed loop rail structure is designed such that after removing the pin bones from said fish fillets, the pin bone removal units have reached an end part of said processing section.

6. The pin bone removal apparatus according to claim 1, wherein the length of the processing section corresponds to a length of at least two fish fillets and where said pin bone removal is performed by at least two pin bone removal units at a time on two or more different fish fillets.

7. The pin bone removal apparatus according to claim 6, wherein the step of operating the plurality of the pin bone removal units comprises controlling the movement of said pin bone removal unit from said starting position back to said processing section.

8. The pin bone removal apparatus according to claim 1, wherein said conveyor means comprises an endless belt on which said fish fillets can rest while being conveyed, where said apparatus further comprises a member arranged below the endless belt configured to supply an upward pressure on said endless belt and on the fish fillets while the pin bone removal takes place.

9. The pin bone removal apparatus according to claim 8, wherein said member is connected to a moving mechanism and is advanced in a synchronized manner with a pin bone removal unit while the pin bone removal takes place such that the member and the pin bone removal unit are essentially in the same vertical plane.

10. The pin bone removal apparatus according to claim 1, further comprising:
a detection mechanism arranged upstream to the closed loop rail structure for detecting at least one characteristics of incoming fish fillets, and
a control unit connected to the detection mechanism configured to utilize the data from the detection mechanism in operating the plurality of the pin bone removal units.

11. The pin bone removal apparatus according to claim 1, wherein the step of recirculating at least one pin bone removal unit along the returning section comprises accelerating the at least one pin bone removal unit up to said starting position.

12. The pin bone removal apparatus according to claim 1, said plurality of pin bone removal units comprise side structures to which said pin bone roller is attached to.

13. The pin bone removal apparatus according to claim 1, wherein prior to returning said at least one pin bone removal unit back to said starting position of said processing section, the at least one pin bone removal unit is temporarily stalled.

14. The pin bone removal apparatus according to claim 1, further comprising a cleaning station arranged at the closed loop rail structure for allowing the bone removal units to pass there through and for removing pin bones from the pin bone rollers.

15. The pin bone removal apparatus according to claim 14, wherein the cleaning station is arranged at the returning section.

16. A method of removing pin bones in fish fillets while the fish fillets are conveyed by a conveyor means at a first conveying speed using a pin bone removal apparatus which comprises:
a plurality of pin bone removal units, each of which comprises a pin bone roller for pulling the pin bones from the fish fillets, and
a closed loop rail structure to which the plurality of pin bone removal units are slideable attached to, where the closed loop rail structure comprises a processing section, and a returning section,
wherein the method comprises:
moving at least one pin bone removal units along the processing section parallel to said fish fillets at a second conveying speed and engage with the surface of the fish fillets while removing the pin bones therefrom with said pin bone roller, where subsequent to the pin bone removal,
recirculating the at least one pin bone removal unit along said returning section and back to a starting position of said processing section where said the pin bone removal process is repeated on a forthcoming fish fillet.

17. The method according to claim 16, wherein the second conveying speed is different from the first conveying speed.

* * * * *